(12) United States Patent
Morris et al.

(10) Patent No.: US 7,873,629 B1
(45) Date of Patent: Jan. 18, 2011

(54) DYNAMIC PARTITION ENHANCED INEQUALITY JOINING USING A VALUE-COUNT INDEX

(75) Inventors: J. Mark Morris, Poway, CA (US); Bhashyam Ramesh, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 896 days.

(21) Appl. No.: 10/862,649

(22) Filed: Jun. 7, 2004

(51) Int. Cl.
 G06F 7/00 (2006.01)
 G06F 17/30 (2006.01)
(52) U.S. Cl. ............... 707/715; 707/713; 707/714
(58) Field of Classification Search ........... 707/1–10, 707/100–104, 200–206, 713, 714, 715
See application file for complete search history.

(56) References Cited

U.S. PATENT DOCUMENTS

| | | | |
|---|---|---|---|
| 4,956,774 A | | 9/1990 | Shibamiya et al. |
| 5,241,648 A | * | 8/1993 | Cheng et al. .................. 707/7 |
| 5,557,791 A | | 9/1996 | Cheng et al. |
| 5,822,750 A | * | 10/1998 | Jou et al. .................... 707/2 |
| 5,903,893 A | * | 5/1999 | Kleewein et al. ............ 707/10 |
| 5,918,225 A | | 6/1999 | White et al. |
| 5,930,785 A | * | 7/1999 | Lohman et al. ............... 707/2 |
| 5,983,215 A | * | 11/1999 | Ross et al. ................... 707/2 |
| 6,052,693 A | * | 4/2000 | Smith et al. ............. 707/104.1 |
| 6,167,399 A | * | 12/2000 | Hoang ....................... 707/5 |
| 6,226,639 B1 | * | 5/2001 | Lindsay et al. .............. 707/5 |
| 6,505,189 B1 | * | 1/2003 | On Au et al. ................ 707/2 |
| 6,944,633 B1 | * | 9/2005 | Higa et al. .............. 707/104.1 |
| 2001/0000536 A1 | * | 4/2001 | Tarin ...................... 707/102 |
| 2001/0014888 A1 | * | 8/2001 | Tsuchida et al. .............. 707/2 |
| 2003/0074348 A1 | * | 4/2003 | Sinclair et al. ............... 707/2 |
| 2003/0217033 A1 | | 11/2003 | Sandler et al. |
| 2004/0172400 A1 | * | 9/2004 | Zarom et al. ............... 707/100 |
| 2004/0249845 A1 | | 12/2004 | Das |
| 2004/0260684 A1 | * | 12/2004 | Agrawal et al. .............. 707/3 |
| 2005/0149491 A1 | * | 7/2005 | Bakalash et al. ............. 707/2 |
| 2005/0160102 A1 | | 7/2005 | Abdo et al. |
| 2005/0240615 A1 | * | 10/2005 | Barsness et al. ........... 707/102 |
| 2006/0047638 A1 | * | 3/2006 | Dettinger et al. ............. 707/3 |

OTHER PUBLICATIONS

"Joining Tables in SQL Queries," Ron Plew, et al, SAMS Publishing, pp. 1-14, Oct. 25, 2002.*

(Continued)

*Primary Examiner*—Apu M Mofiz
*Assistant Examiner*—Jared M Bibbee
(74) *Attorney, Agent, or Firm*—Howard Speight

(57) ABSTRACT

Methods, computer programs, and database systems for performing a database query to join a column A and a column B on an inequality condition are disclosed. A database includes value-count indexes for columns A and B. Minimum and a maximum values for A and B are determined, using the value-count indexes for A and B, respectively. The method includes defining three or more sets of values in A and B, relative to the minimum and maximum values for B and A, respectively. The method includes generating one or more Cartesian products between values in A and B. The database query is performed on a set of values in A and a set of values in B to generate a partial query result. The method includes merging one or more Cartesian products and the partial query result.

51 Claims, 12 Drawing Sheets

OTHER PUBLICATIONS

"Non-Final Office Action", *Non-Final Office Action in* U.S. Appl. No. 10/862,689 (Dec. 14, 2008).

Gennick, Jonathan et al., "Transact-SQL Cookbook", http://oreilly.com/catalog/transqlcook/errata/transqlcook.confirmed8/21/2006, (Jul. 15, 2002).

"SQL-J Language Reference", http://www.novell.com/documentation/extendas37/docs/help/java/jdkee/cloudscape/doc/html/coredocs/sqlj18.htm, 19.

O'Neil, Patrick et al., "Multi-Table Joins Through Bitmapped Join Indices", *SIGMOND Record*, vol. 24, No. 3, Sep. 1995, 8-11.

"Oracle9i Database Performance Tuning Guide and Reference", *Release 2* (9,2) Oct. 2002 Part No. A96533-02, 9-14 through 9-18.

Chigrik, Alexander "MS SQL, SQL Server 7.0: Merge Joins", http://www.databasejournal.com/features/mssql/article.php/1459141/SQL-Server-70-Merge-Joins.htm, (Aug. 31, 2000).

Ooi, Bing C., "Subquery", http://web.archive.org/web/20030409135608/http://www.comp.nus.edu.sg/~ooibc/courses/sql/dml_query_subquery.htm.

Miner, Eric "New Optimizer and Query Execution Options in Adaptive Server Enterprise 12.0", *Sybase Techwave*, (1999).

\* cited by examiner

DYNAMIC PARTITION ENHANCED INEQUALITY JOINING USING A VALUE-COUNT INDEX

CROSS REFERENCE TO RELATED APPLICATIONS

This application is related to the United States Patent Application entitled Dynamic Partition Enhanced Joining by Mark Morris and Bhashyam Ramesh, Ser. No. 10/862,686, filed on even date.

This application is related to the United States Patent Application entitled Dynamic Partition Enhanced Joining Using A Value-Count Index by Mark Morris and Bhashyam Ramesh, Ser. No. 10/862,689, filed on even date.

BACKGROUND

One important feature in relational database system (RDBMS) is the ability to perform queries that join columns from two or more tables. An example of a query including a join is:

SELECT T1.*, T2.* FROM T1, T2 WHERE T1.A equality_condition T2.B;

where T1 and T2 are tables, T1.A is a column in T1, T2.B is a column in T2, and equality_condition is any condition requiring equality between the operands to the condition. The example query above will return all of the columns in T1 horizontally concatenated with all of the columns in T2, for rows where T1.A and T2.B satisfy the equality condition. In mathematical terms, this query may be described as a Cartesian product with a condition or cross product with a condition.

SUMMARY

In general, in one aspect, the invention features a method of performing a database query to join a column A and a column B on an inequality condition. A database includes value-count indexes for columns A and B. The method includes determining a minimum and a maximum value for A, using the value-count index for A. The method includes determining a minimum and a maximum value for B, using the value-count index for B. The method includes defining three or more sets of values in A, relative to the minimum and maximum values for B. The method includes defining three or more sets of values in B, relative to the minimum and maximum values for A. The method includes generating one or more Cartesian products, where each Cartesian product is between a set of values in A and a set of values in B. The method includes performing the database query on a set of values in A and a set of values in B to generate a partial query result. The method includes merging one or more Cartesian products and the partial query result.

Implementations of the invention may include one or more of the following. Determining a minimum and a maximum value for A, using the value-count index for A may include scanning the value-count index for A to determine the minimum value for A and the maximum value for A. Determining a minimum and a maximum value for B, using the value-count index for B may include scanning the value-count index for B to determine the minimum value for B and the maximum value for B.

Column A may be in a table T1 that includes zero or more rows and one or more columns. Defining three sets of values in A, relative to the minimum and maximum values for B may include, for each row in T1, if A is less than the minimum value for B, projecting one or more columns from the row into a partition D. Defining three sets of values in A, relative to the minimum and maximum values for B may include, for each row in T1, if A is less than or equal to the maximum value for B and T1.A is greater than or equal to the minimum value for B, projecting one or more columns from the row into a partition E. Defining three sets of values in A, relative to the minimum and maximum values for B may include, for each row in T1, if A is greater than the maximum value for B, projecting one or more columns from the row into a partition F.

Column B may be in a table T2 that includes zero or more rows and one or more columns. Defining three sets of values in B, relative to the minimum and maximum values for A may includes, for each row in T2, if B is less than the minimum value for A, projecting one or more columns from the row into a partition X. Defining three sets of values in B, relative to the minimum and maximum values for A may includes, for each row in T2, if B is less than or equal to the maximum value for A and T1.B is greater than or equal to the minimum value for A, projecting one or more columns from the row into a partition Y. Defining three sets of values in B, relative to the minimum and maximum values for A may includes, for each row in T2, if B is greater than the maximum value for A, projecting one or more columns from the row into a partition Z.

The inequality condition may be a "less than" or a "less than or equal" condition. Generating one or more Cartesian products may include generating a Cartesian products of partition D and partition Y, generating a Cartesian product of partition D and partition Z, and generating a Cartesian product of partition E and partition Z. Performing the database query on a set of values in A and a set of values in B to generate a partial query result may include performing the database query on partition E and partition Y. Merging one or more Cartesian products and the partial query result may include merging one or more of the following: the partial query result of the database query on partition E and partition Y, the Cartesians product of partition D and partition Y, the Cartesian product of partition D and partition Z; and the Cartesian product of partition E and partition Z.

The inequality condition may be a "not equal" condition. Generating one or more Cartesian products may include generating one or more of the following Cartesian products: the Cartesian product of partition D and partition Y, the Cartesian product of partition D and partition Z, the Cartesian product of partition E and partition X, the Cartesian product of partition E and partition Z, the Cartesian product of partition F and partition X; and the a Cartesian product of partition F and partition Y. Performing the database query on a set of values in A and a set of values in B to generate a partial query result may include performing the database query on partition E and partition Y. Merging one or more Cartesian products and the partial query result may include merging one or more of the following: the partial query result of the database query on partition E and partition Y, the Cartesian product of partition D and partition Y, the Cartesian product of partition D and partition Z, the Cartesian product of partition E and partition X, the Cartesian product of partition E and partition Z, the Cartesian product of partition F and partition X; and the Cartesian product of partition F and partition Y.

Generating one or more Cartesian products may include merging partition D and partition F to form a partition DF. Generating one or more Cartesian products may include merging partition X, partition Y, and partition Z to for a partition XYZ. Generating one or more Cartesian products may include generating a Cartesian product of partition DF and partition XYZ. Performing the database query on a set of values in A and a set of values in B to generate a partial query result may include performing the database query on partition E and partition Y. Merging one or more Cartesian products and the partial query result may include merging one or more of the following: the partial query result of the database query on partition E and partition Y; the Cartesian product of partition DF and partition XYZ; the Cartesian product of partition E and partition X; and the Cartesian product of partition E and partition Z.

The inequality condition may be a "not equal" condition. Performing the database query on a set of values in A and a set of values in B to generate a partial query result may include performing the database query on partition E and partition Y.

The inequality condition may be a "less than or equal" condition or a "greater than or equal" condition. Column A may be in a table T1 that includes zero or more rows and one or more columns. Defining three sets of values in A, relative to the minimum and maximum values for B may include, for each row in T1, if T1.A is less than or equal to the minimum value for B, projecting one or more columns from the row into a partition D. Defining three sets of values in A, relative to the minimum and maximum values for B may include, for each row in T1, if T1.A is less than or equal to the maximum value for B and T1.A is greater than the minimum value for B, projecting one or more columns from the row into a partition E. Defining three sets of values in A, relative to the minimum and maximum values for B may include, for each row in T1, if T1.A is greater than or the maximum value for B, projecting one or more columns from the row into a partition F.

Column B may be in a table T2 that may include zero or more rows and one or more columns. Defining three sets of values in B, relative to the minimum and maximum values for A may include, for each row in T2, if T2.B is less than the minimum value for A, projecting one or more columns from the row into a partition X. Defining three sets of values in B, relative to the minimum and maximum values for A may include, for each row in T2, if T2.B is less than the maximum value for A and T2.B is greater than or equal to the minimum value for A, projecting one or more columns from the row into a partition Y. Defining three sets of values in B, relative to the minimum and maximum values for A may include, for each row in T2, if T2.B is greater than or equal to the maximum value for A, projecting one or more columns from the row into a partition Z.

The inequality condition may be a "greater than" condition. The method may include converting the query to a query including a "less than" inequality condition. The inequality condition may be a "greater than or equal to" condition. The method may include converting the query to a query including a "less than or equal to" inequality condition.

In general, in another aspect, the invention features a computer program, stored on a tangible storage medium for use in performing a database query to join a column A and a column B on an inequality condition. A database includes value-count indexes for columns A and B. The computer program includes executable instructions that cause a computer to determine a minimum and a maximum value for A, using the value-count index for A. The computer program includes executable instructions that cause a computer to determine a minimum and a maximum value for B, using the value-count index for B. The computer program includes executable instructions that cause a computer to define three or more sets of values in A, relative to the minimum and maximum values for B. The computer program includes executable instructions that cause a computer to define three or more sets of values in B, relative to the minimum and maximum values for A. The computer program includes executable instructions that cause a computer to generate one or more Cartesian products, where each Cartesian product is between a set of values in A and a set of values in B. The computer program includes executable instructions that cause a computer to perform the database query on a set of values in A and a set of values in B to generate a partial query result. The computer program includes executable instructions that cause a computer to merge one or more Cartesian products and the result.

In general, in another aspect, the invention features a database system that includes a massively parallel processing system. The massively parallel processing system includes one or more nodes, a plurality of CPUs, a plurality of data storage facilities, and a process for execution on the massively parallel processing system for performing a database query to join a column A and a column B on an inequality condition, a database including value-count indexes for columns A and B. Each of the one or more nodes provide access to one or more CPUs. Each of the one or more CPUs provide access to one or more data storage facilities. The database includes value-count indexes for columns A and B. The process includes determining a minimum and a maximum value for A, using the value-count index for A. The process includes determining a minimum and a maximum value for B, using the value-count index for B. The process includes defining three or more sets of values in A, relative to the minimum and maximum values for B. The process includes defining three or more sets of values in B, relative to the minimum and maximum values for A. The process includes generating one or more Cartesian products, where each Cartesian product is between a set of values in A and a set of values in B. The process includes performing the database query on a set of values in A and a set of values in B to generate a partial query result. The process includes merging one or more Cartesian products and the result.

DETAILED DESCRIPTION

Figure 1:
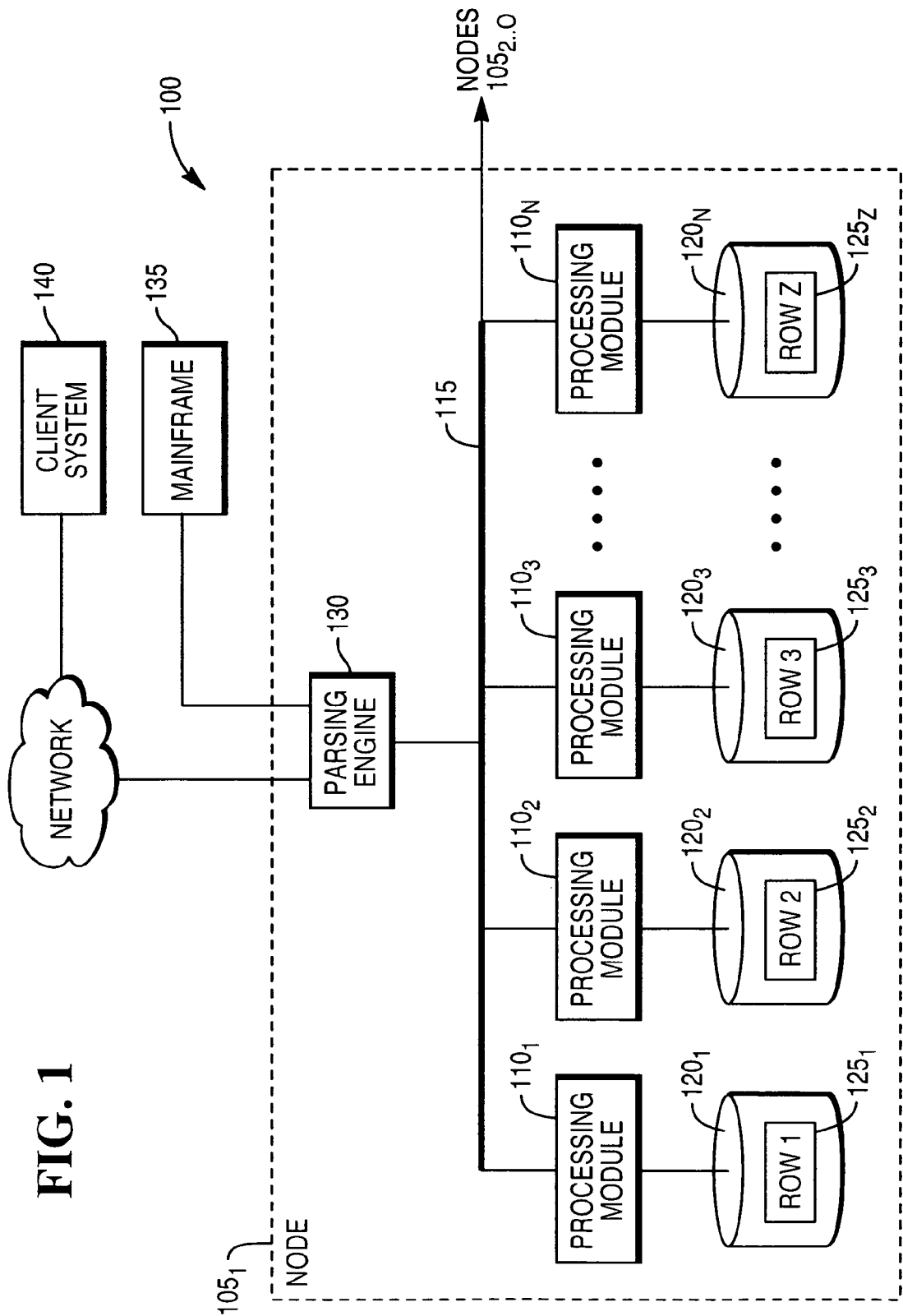
FIG. 1 is a block diagram of a node of a database system.

The techniques for performing joins disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
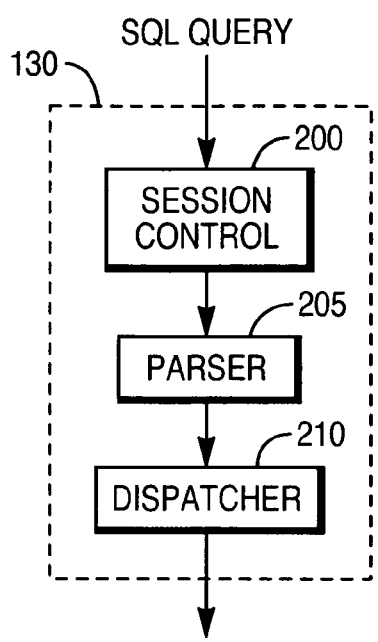
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
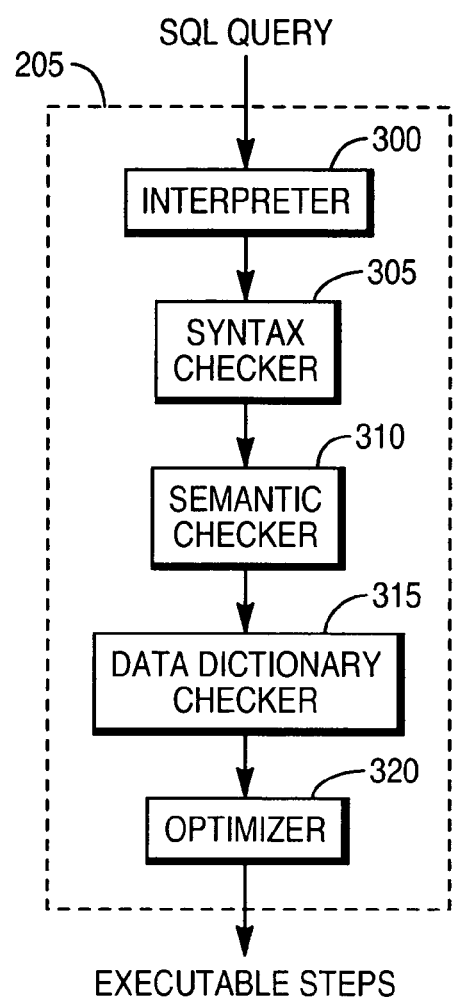
FIG. 3 is a flow chart a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

Figure 4:
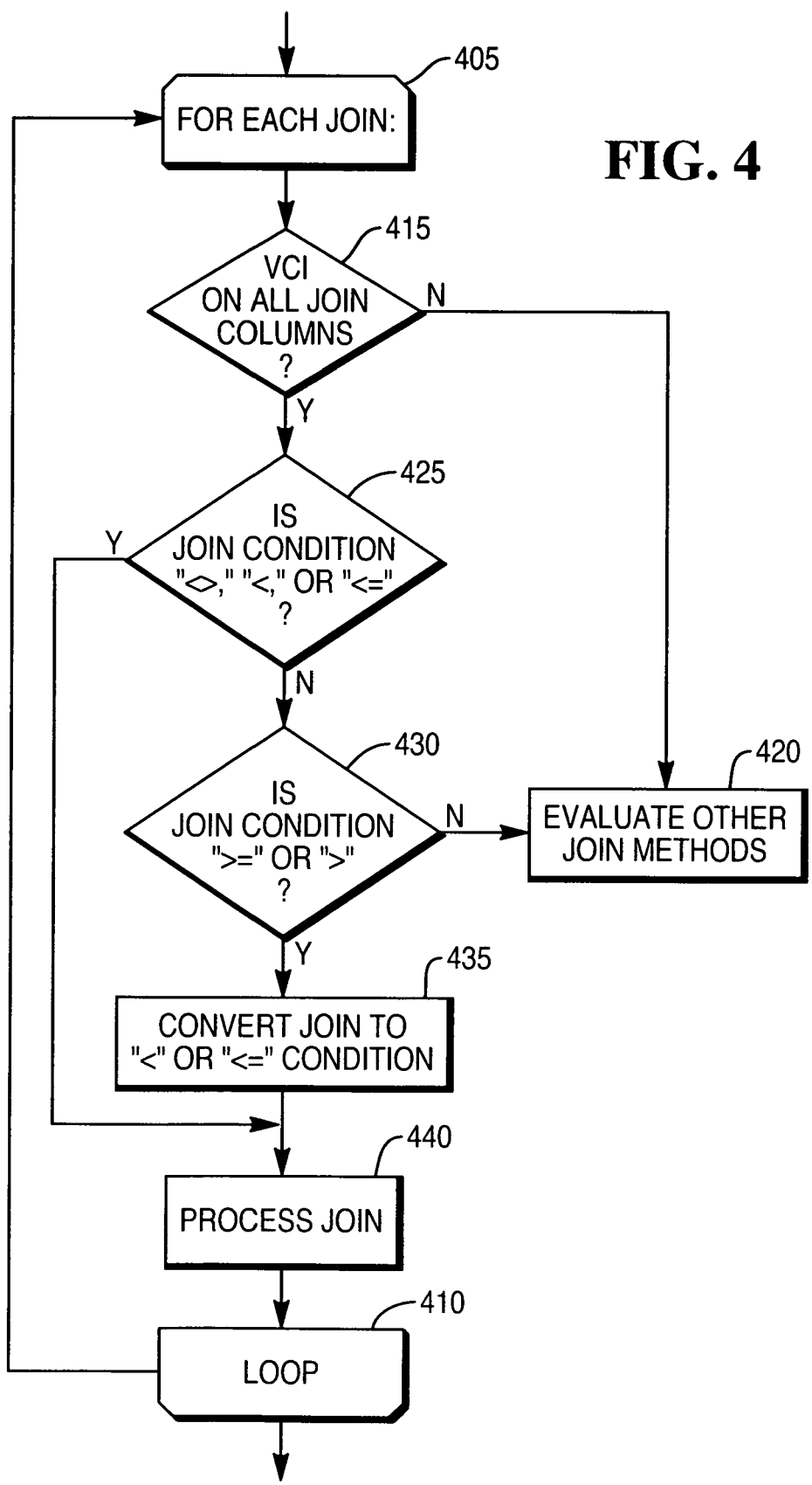
FIG. 4 is a flow chart of a system for performing joins.

An example system for performing a SQL query including one or more joins is shown in FIG. 4. The system starts and enters a loop defined by blocks 405 and 410. The system will loop once for each join in the SQL query (block 405). For example, assume the system receives the following SQL query:

SELECT T1.*, T2.*, T3.* FROM T1, T2, T3 WHERE T1.A condition) T2.B AND T1.A condition2 T3.C;

where T1, T2, and T3 are tables, T1.A is a column in T1, T2.B is a column in T2, T3.0 is a column in T3, and condition is a comparison between the operands to the condition. In one example implementation, the system will first perform a join between T1 and T2 on the condition T1.A condition) T2.B. Next, the system will perform a join between T1 and T3 on the condition T1.A condition2 T3.C. Finally, the system will perform a join of the two previous results. In this example implementation, the query is decomposed into three join operations and the system will loop (block 405 and 410) three times.

Another example system for performing a SQL query including one or more joins performs the example SQL query above using two joins. The system performs a join between T1 and T2 on the condition T1.A equality_condition T2.B and stores the result. In one example implementation, the result is stored in a work table or a spool table 51. The system then performs a join between T3 and S1 on the condition S1.A equality_condition T3.C.

Within the loop defined by blocks 405 and 410 the system determines if the DBS 100 includes a Value Count Index (VCI) for each of the join columns (e.g., T1.A and T2.B). A VCI is a mechanism or data structure for tracking which values appear in a column and how many times the values appear in the column. One example VCI is an aggregate join index that is automatically updated each time a value in indexed column is added, deleted, or altered. The VCI typically contains two columns: a value column and a count column. The value column represents the value in the indexed column and the count column represents the number of occurrences of the value in the column. An example SQL query to create a value count index on T1.A is:

CREATE JOIN INDEX VCI1a as SELECT A, COUNT (A) FROM T1;

If the DBS 100 does not include a VCI for each of the columns in the join (block 415), the system evaluates other join methods (block 420). Otherwise, the system determines if the join condition is a not equal join condition (i.e., "<>"), a less than join condition (i.e., "<"), or a less than or equal to join condition (i.e., "<=") and, if so, the system processes the join (block 440, which is described in greater detail below). Otherwise, the system determines if the join condition is a greater than join condition (i.e., ">") or a greater than or equal to join condition (i.e., ">=") and, if so the system converts the join to a less than or a less than or equal to join condition (block 435, which is discussed in greater detail below). If the join condition is not an inequality condition, the system uses another join method (block 420).

The system converts greater than and greater than or equal to conditions to less than and less than or equal to conditions (block 435). One example system reverses the tables in the FROM clause and in the join condition and reverses the join condition operator. For example, the system converts conditions of the form:

SELECT T1.*, T2.* FROM T1, T2 WHERE T1.A>T2.B;

to:

SELECT T1.*, T2.* FROM T2, T1 WHERE T2.B<T1.A;

and conditions of the form:

SELECT T1.*, T2.* FROM T1, T2 WHERE T1.A >=T2.B;

to:

SELECT T1.*, T2.* FROM T2, T1 WHERE T2.B<=T1.A.

Figure 5:
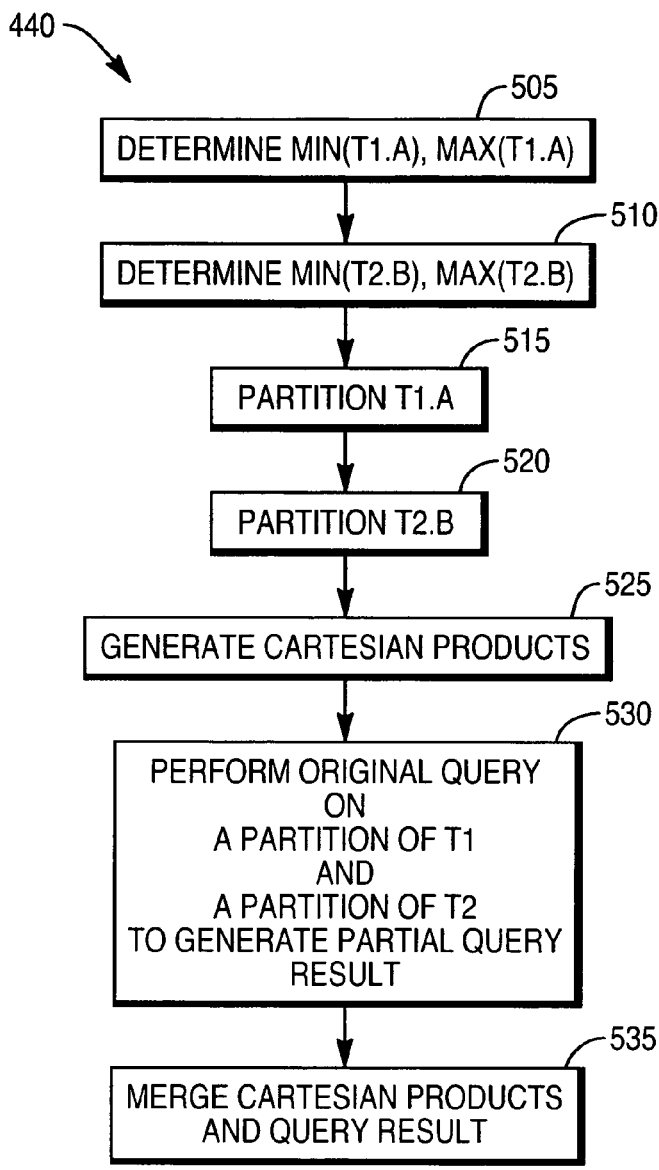
FIG. 5 is a flow chart of a system for performing a join.

An example system for processing a join (block 440) is shown in FIG. 5. The system receives a join of the following form:

SELECT T1.*, T2.* from T1, T2 WHERE T1.A inequality_condition T2.B;

where T1 and T2 are tables, T1.A is a column in T1, and T2.B is a column in T2, and inequality_condition is any comparison that evaluates the operands for an inequality. Although T1 and T2 have separate designations in this example, in some implementations they are the same table. Likewise, in some implementations, columns T1.A and T2.B are the same column. While this example query returns all columns from T1 and T2, certain implementations return zero or more columns from each of tables T1 and T2. The database system includes a VCI for T1.A (i.e., VCI1A) and a VCI for T2.B (i.e., VCI2B).

Figure 6:
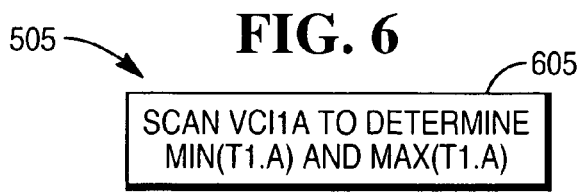
FIGS. 6-7 are flow charts of a system for determining minimum and maximum values for a column.

The system determines the minimum and maximum values in column T1.A (block 505). An example system for determining the minimum and maximum values in column T1.A is shown in FIG. 6. The system scans VCI1A to determine the minimum value in T1.A and the maximum value in T1.A (block 605). The system may scan one or more rows to determine the minimum and maximum values for T1.A or, if the VCI for T1.A is sorted, the system may only have to read two locations to determine the minimum and maximum values in T1.A.

Figure 7:
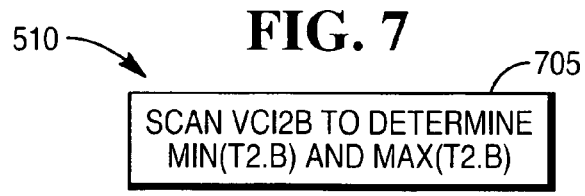

Returning to FIG. 5, the system determines the minimum and maximum values for column T2.B (block 510). An example system for determining the minimum and maximum values for column B is shown in FIG. 7. The system scans the value count index for T2.B (i.e., VCI2B) to determine the minimum value in T2.B and the maximum value in T2.B (block 605). The system may scan one or more rows to determine the minimum and maximum values for T2.B or, if the VCI for T2.B is sorted, the system may only have to read two locations to determine the minimum and maximum values in T2.B.

Figure 8:
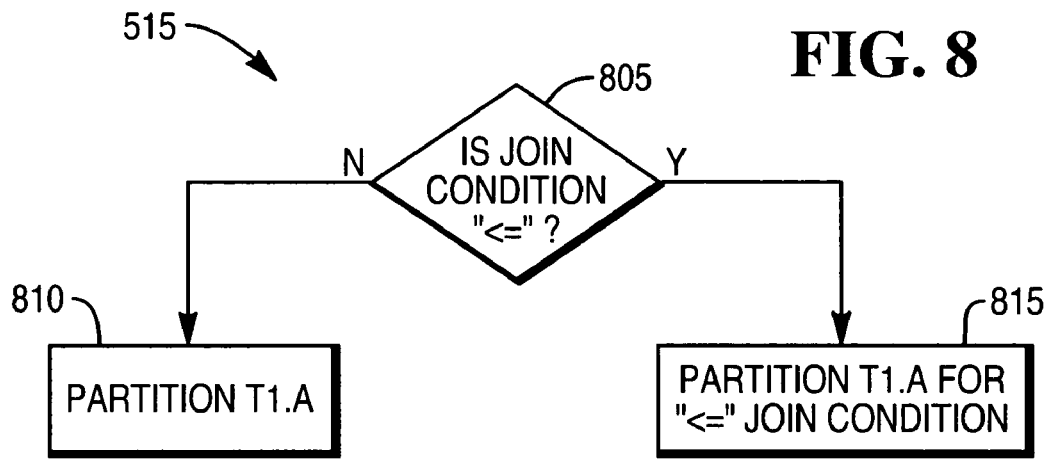
FIGS. 8-13 are flow charts of a system for partitioning join tables.

Returning to FIG. 5, the system partitions T1.A (block 515). An example system for partitioning T1.A is shown in FIG. 8. The system determines if the join condition is a less than or equal to join condition and, if so, the system partitions T1.A by proceeding to block 810, otherwise it partitions T1.A by proceeding to block 815.

Figure 10:
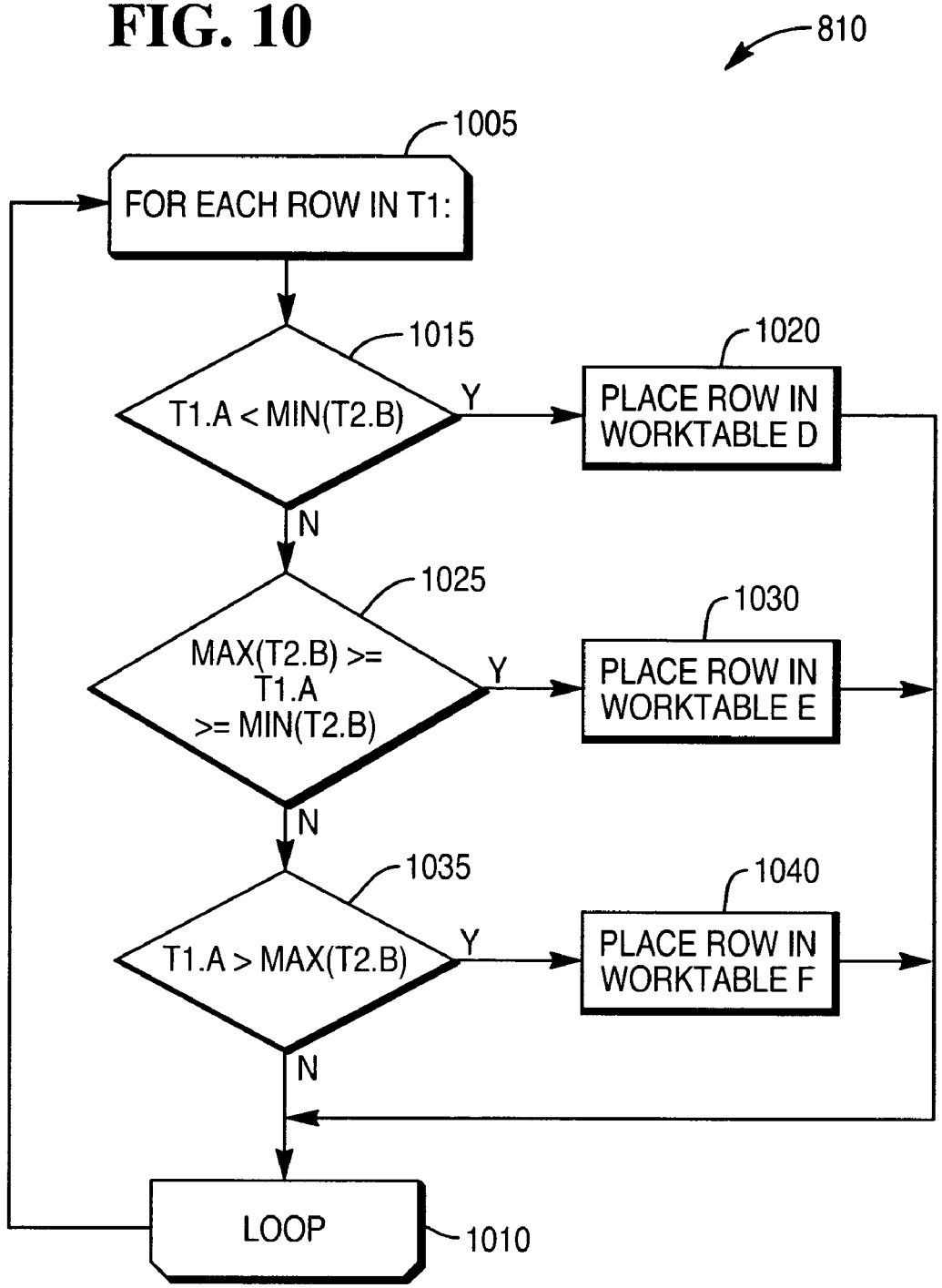

An example system for partitioning T1, where the join condition is not a less than or equal to condition (block 810) is shown in FIG. 10. The system starts and enters a loop defined by blocks 1005 and 1010. The system loops once for each row in T1 (block 1005). Within the loop, if the value of T1.A is less than the minimum value of T2.B (block 1010), the system places one or more columns of the row in a partition D (block 1020). If the value of T1.A is less than or equal to the maximum value of T2.B and greater than or equal to the minimum value of T2.B (block 1025), the system places one or more columns of the row in a partition E (block 1030). If the value of T1.A is greater than the maximum value of T2.B (block 1035), the system places one or more columns of the row in a partition F (block 1040). In one example system, each of the partitions D, E, and F are stored in worktables. In another example system the partitions D, E, and F are stored in a table with a partitioned primary index.

Figure 11:
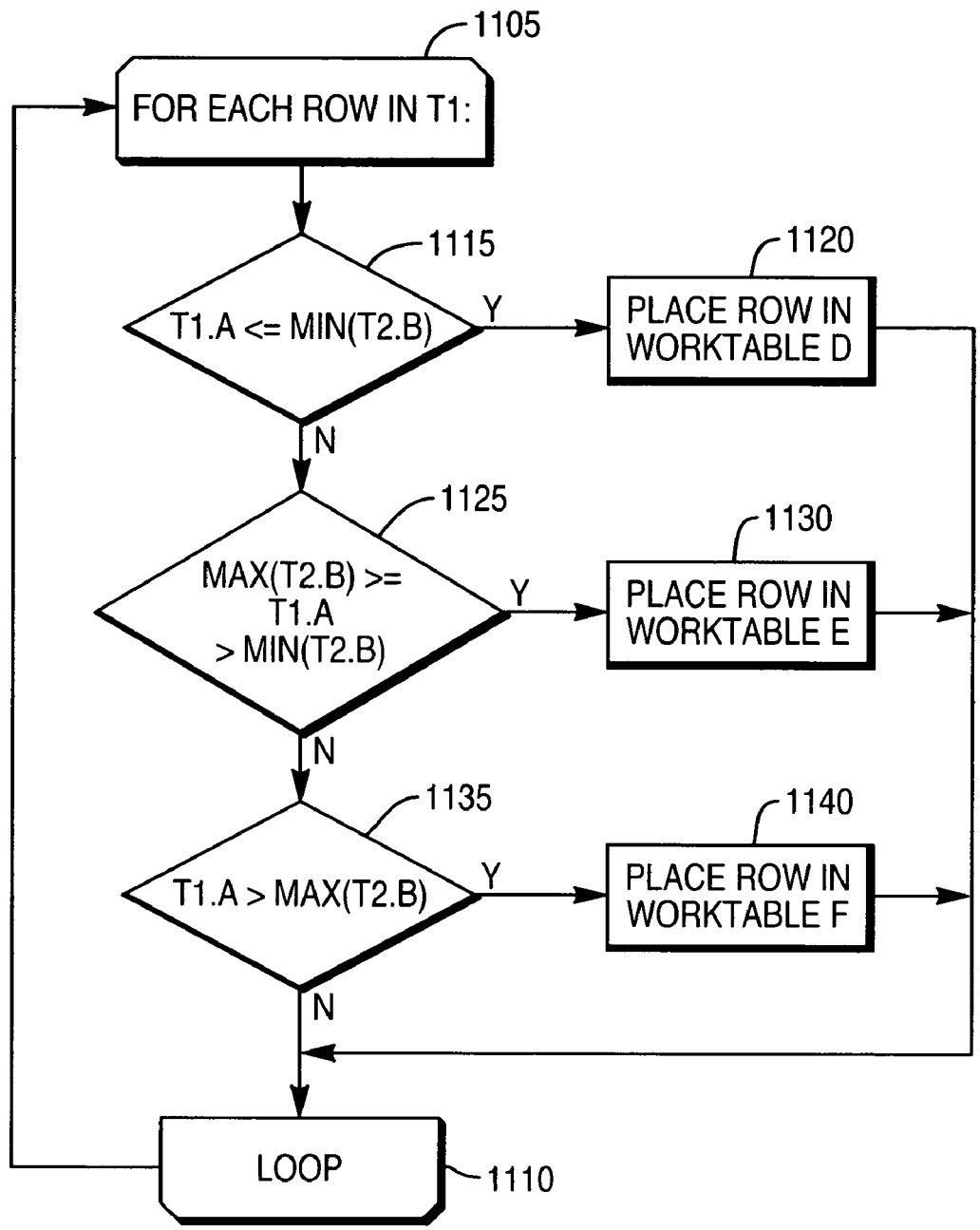

An example system for partitioning T1.A, where the join condition is a less than or equal to condition (block 815) is shown in FIG. 11. The system starts and enters a loop defined by blocks 1005 and 1010. The system loops once for each row in T1 (block 1005). Within the loop, if the value of T1.A is less than or equal to the minimum value of T2.B (block 1010), the system places one or more columns of the row in the partition D (block 1020). If the value of T1.A is less than or equal to the maximum value of T2.B and greater than the minimum value of T2.B (block 1025), the system places one or more columns of the row in the partition E (block 1030). If the value of T1.A is greater than the maximum value of T2.B (block 1035), the system places one or more columns of the row in the partition F (block 1040). In one example system, each of the partitions D, E, and F are stored in worktables. In another example system the partitions D, E, and F are stored in a table with a partitioned primary index.

Figure 9:
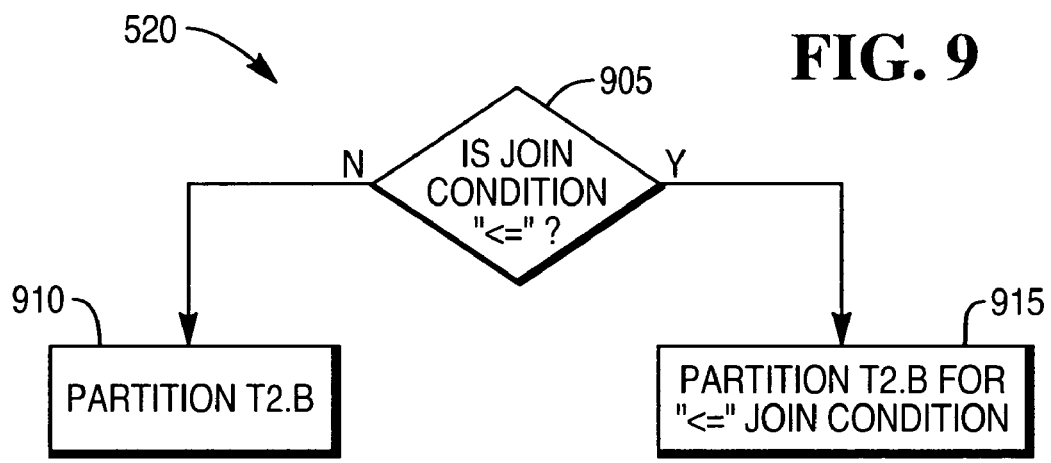

Returning to FIG. 5, the system partitions T2.B (block 520). An example system for partitioning T2.B is shown in FIG. 9. The system determines if the join condition is not a less than or equal to join condition and, if so, the system partitions T2.B by proceeding to block 910, otherwise it partitions T1.A by proceeding to block 915.

Figure 12:
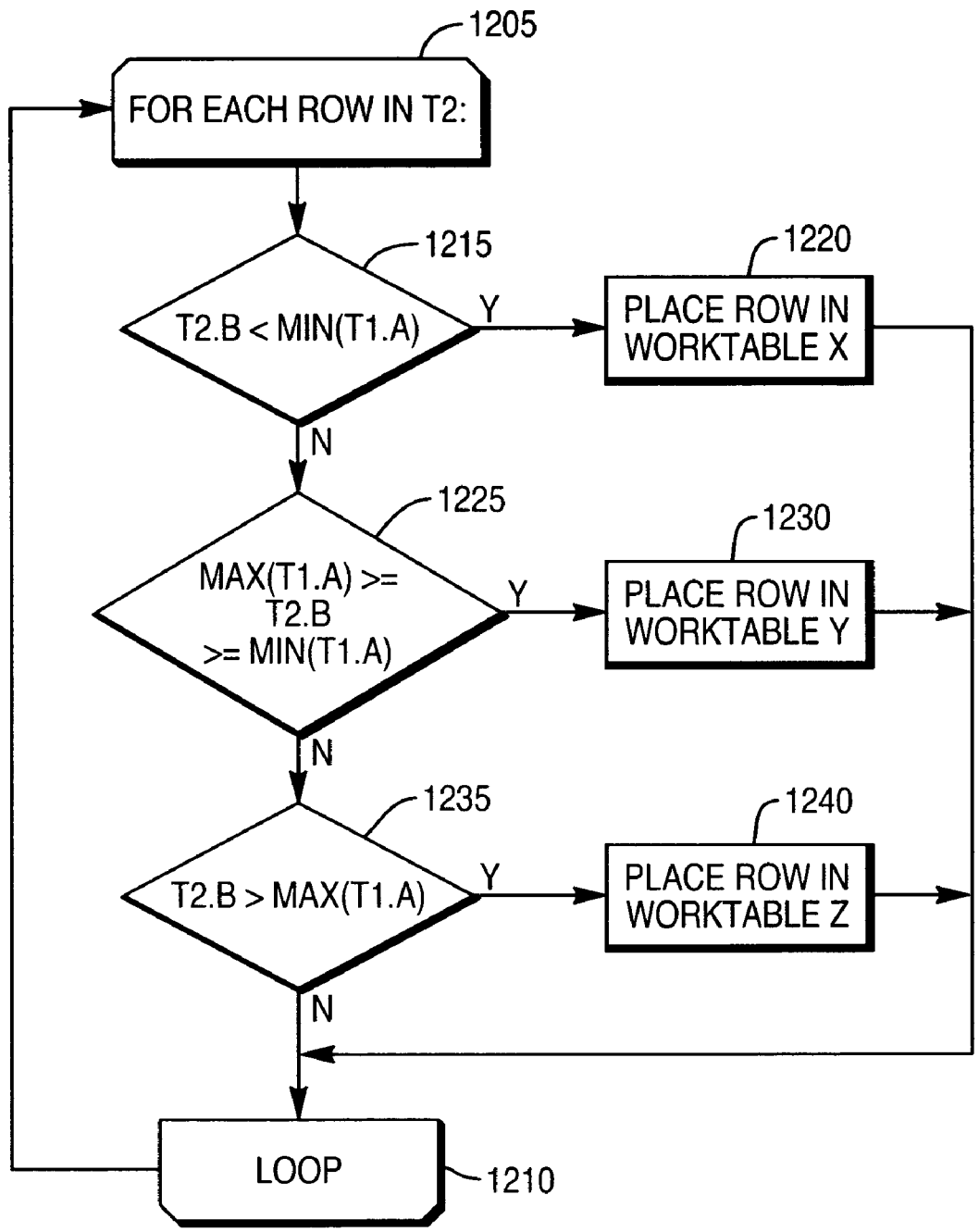

An example system for partitioning T2.B, where the join condition is not a less than or equal to condition (block 910) is shown in FIG. 12. The system starts and enters a loop defined by blocks 1205 and 1210. The system loops once for each row in T2 (block 1205). Within the loop, if the value of T2.B is less than the minimum value of T1.A (block 1210), the system places one or more columns of the row in a partition X (block 1220). If the value of T2.B is less than or equal to the maximum value of T1.A and greater than or equal to the minimum value of T1.A (block 1225), the system places one or more columns of the row in a partition Y (block 1230). If the value of T2.B is greater than the maximum value of T1.A (block 1235), the system places one or more columns of the row in a partition Z (block 1240). In one example system, each of the partitions X, Y, and Z are stored in worktables. In another example system the partitions X, Y, and Z are stored in a table with a partitioned primary index.

Figure 13:
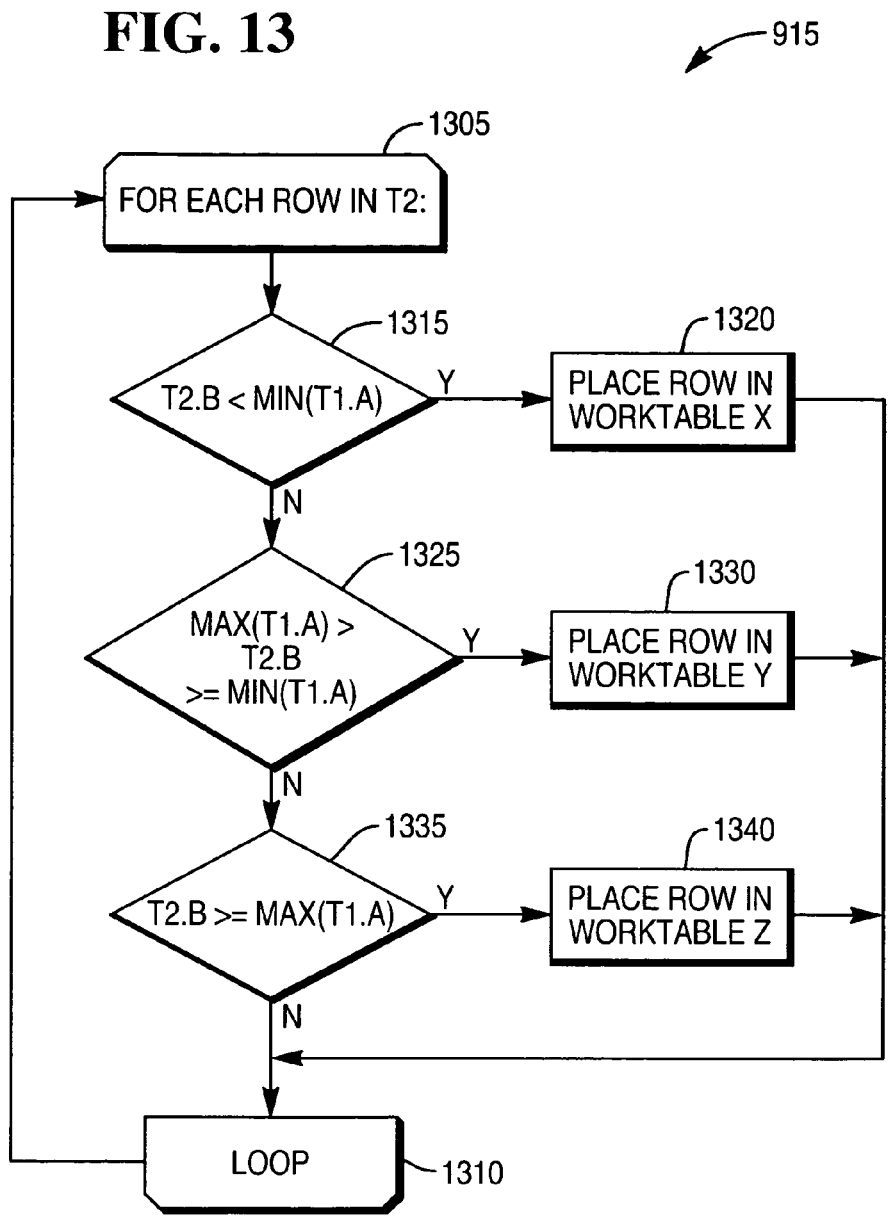

An example system for partitioning T2.B, where the join condition is a less than or equal to condition (block 915) is shown in FIG. 13. The system starts and enters a loop defined by blocks 1305 and 1310. The system loops once for each row in T2 (block 1305). Within the loop, if the value of T2.B is less than the minimum value of T1.A (block 1310), the system places one or more columns of the row in the partition X (block 1020). If the value of T2.B in the row is less than the maximum value of T1.A and greater than or equal to the minimum value of T1.A (block 1325), the system places one or more columns of the row in the partition Y (block 1330). If the value of T2.B is greater than or equal to the maximum value of T1.A (block 1335), the system places one or more columns of the row in the partition Z (block 1340). In one example system, each of the partitions X, Y, and Z are stored in worktables. In another example system the partitions X, Y, and Z are stored in a table with a partitioned primary index.

Figure 14:
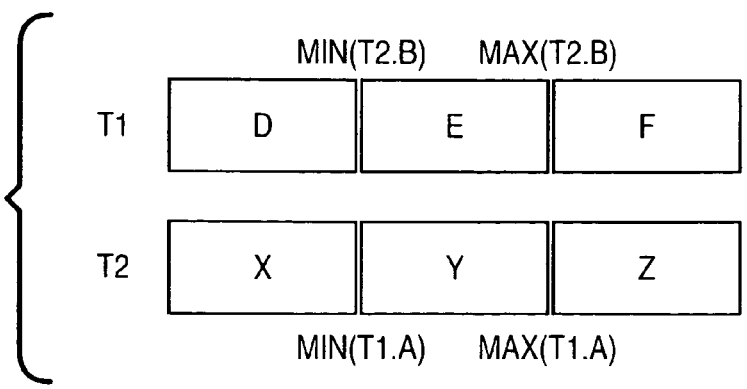
FIGS. 14-15 are illustrations of partitioned tables.
Figure 15:
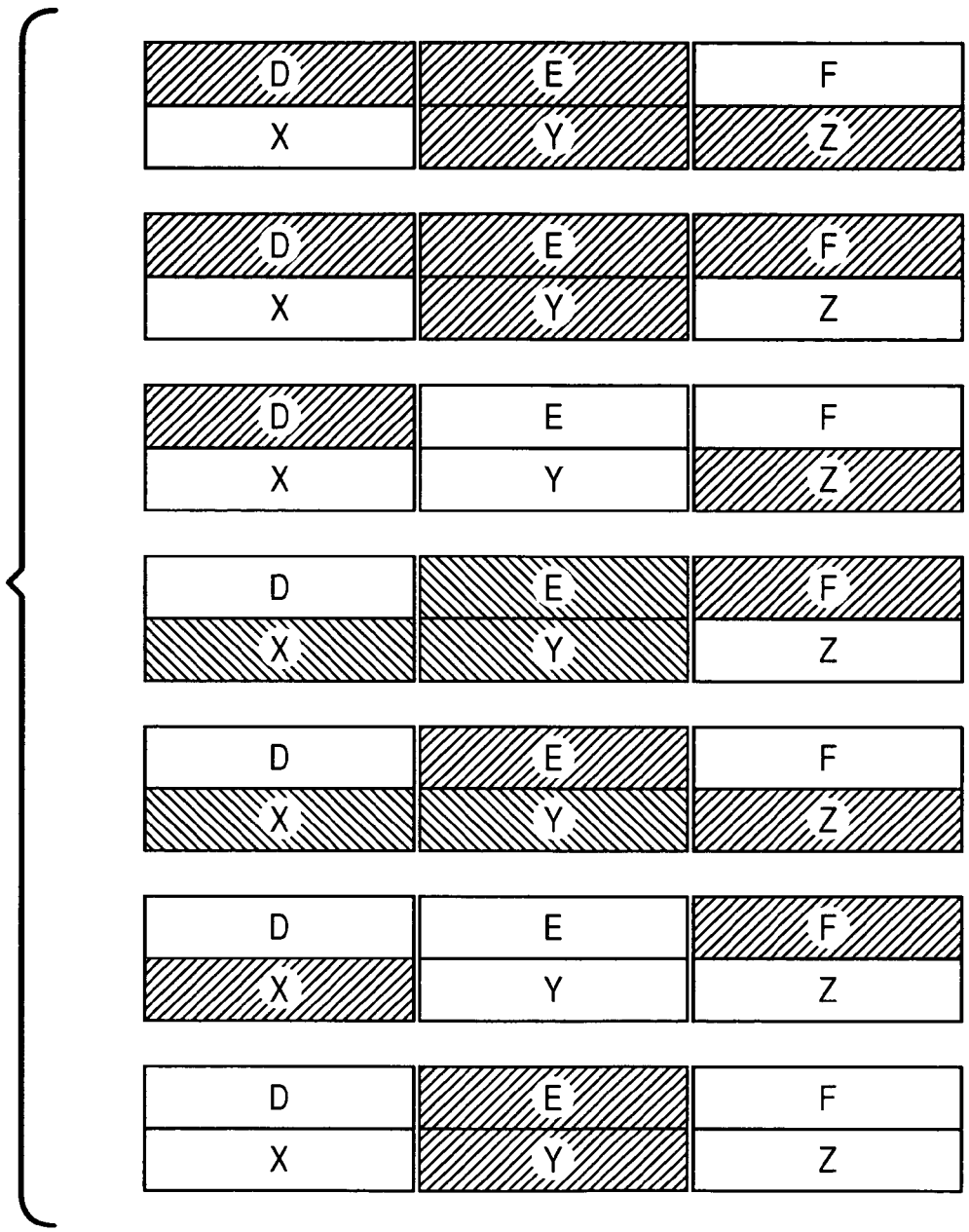

FIG. 14 shows an example of partitioned tables containing T1.A and T2.B. FIG. 15 shows examples value distributions within the partitions D, E, F, X, Y, and Z. The cross-hatched partitions represent partitions that include one or more values, while the unshaded partitions are empty. Because of the relationships between the partitions, some example systems do not determine the Cartesian product of certain combinations of partition. For example, one example system will not determine the Cartesian product of partitions D and X, because one of the partitions is empty. Another example system does not determine the Cartesian product of F and Z, because one of the partitions is empty.

Figure 16:
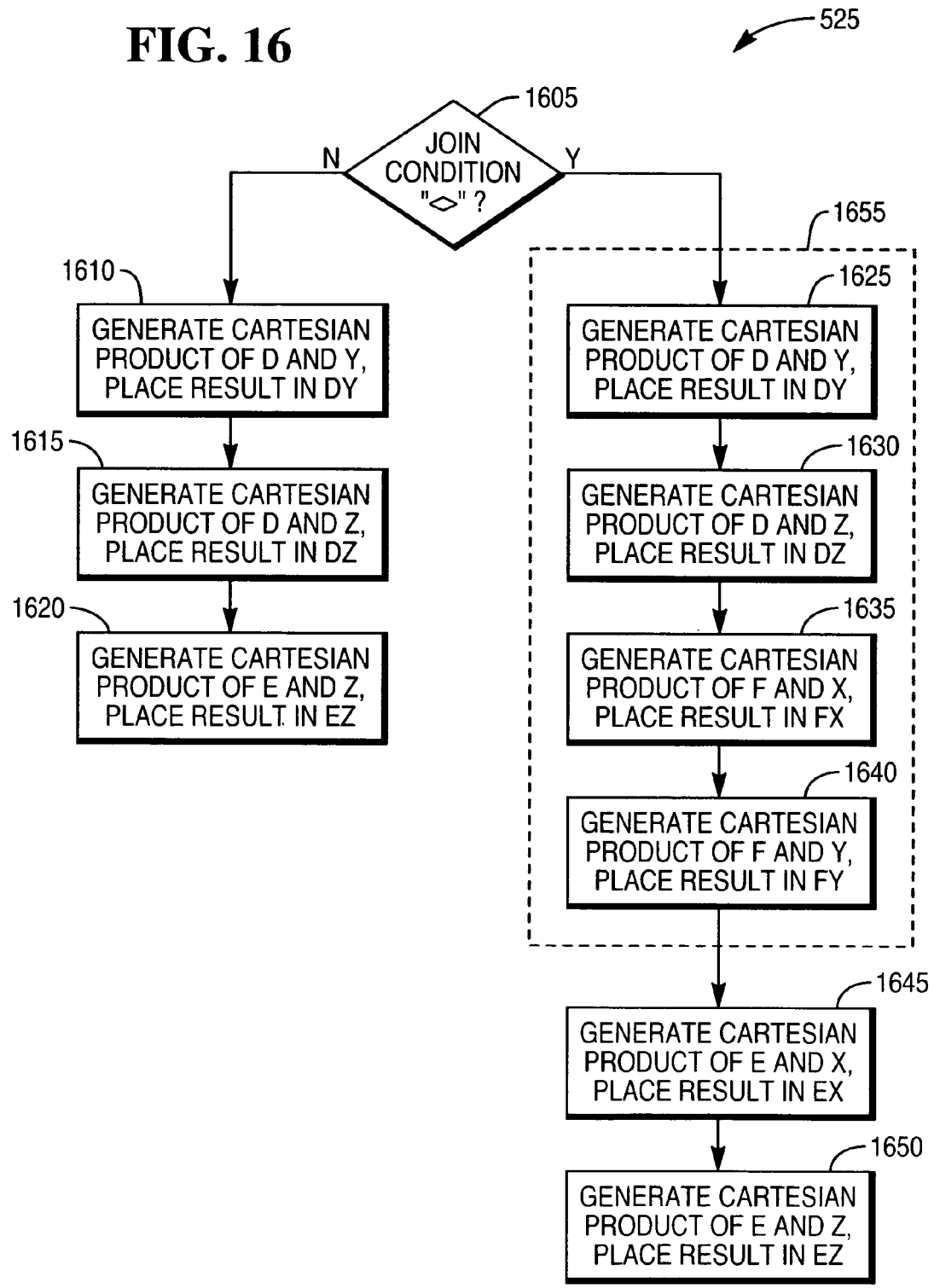
FIGS. 16-17 are flow charts of a system for generating Cartesian products.

Returning to FIG. 5, the system generates Cartesian products of the partitions (block 525). An example system for generating Cartesian products is shown in FIG. 16. The system starts and determines if the join condition is a not-equal condition (i.e., "< >") (block 1605).

If the join condition is not a not equal condition (block 1605), the system generates a Cartesian product of partitions D and Y and places the result in worktable DY. The system generates a Cartesian product of partitions D and Z and places the result in worktable DZ (block 1615). The system generates a Cartesian product of partitions E and Z and places the result in worktable EZ (block 1620).

If the join condition is a not equal condition (block 1605), the system generates a Cartesian product of partitions D and Y and places the result in worktable DY (block 1625). The system generates a Cartesian product of partitions D and Z and places the result in worktable DZ (block 1630). The system generates a Cartesian product of partitions F and X and places the result in worktable FX (block 1635). The system generates a Cartesian product of partitions F and Y and places the result in worktable FY (block 1640). The system generates a Cartesian product of partitions E and X and places the result in worktable EX (block 1645). The system generates a Cartesian product of partitions E and Z and places the result in worktable EZ (block 1650).

Figure 17:
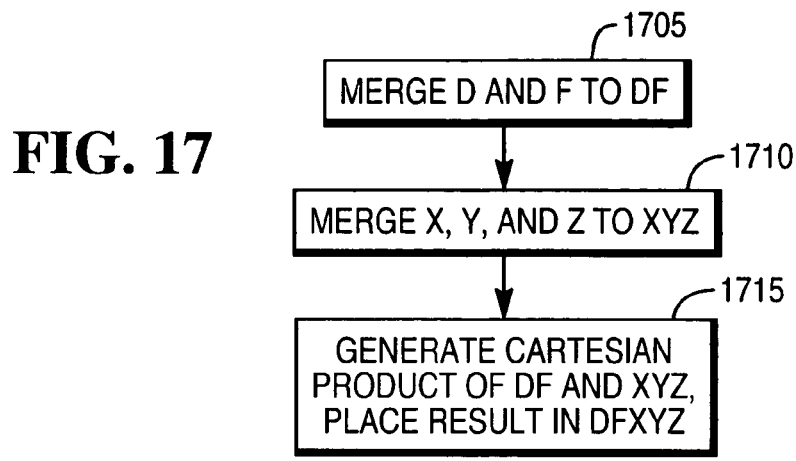

Other example systems perform the Cartesian products differently. One example system replaces the series of Cartesian products within block 1655. The example system, shown in FIG. 17 replaces blocks 1625-1640 (FIG. 16) with one Cartesian product. The system merges partitions D and F and places the result in DF (block 1705). The system merges partitions X, Y, and Z, and places the result in XYZ (block 1710). The system generates the Cartesian product of DF and XYZ and places the result in DFXYZ (block 1715). In this example system, the Cartesian products of partitions D and Y, D and Z, F and X, and F and Y are represented by DFXYZ.

Figure 18:
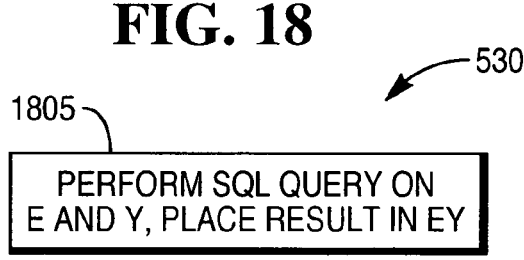
FIG. 18 is a flow chart of a system for performing a SQL query.

Returning to FIG. 5, the system performs the SQL query on a partition of T1.A and a partition of T2.B to produce a partial query result (block 530). An example system for performing the SQL query is shown in FIG. 18. The system performs the SQL query on partitions E and Y and places the result in a worktable EY (block 1805). An example query for performing the SQL query is:

SELECT E.*, Y.* FROM E, Y WHERE E.A condition Y.B;

where condition is the condition in the SQL query.

Returning to FIG. 5, the system merges Cartesian products and query results (block 535).

Figure 19:
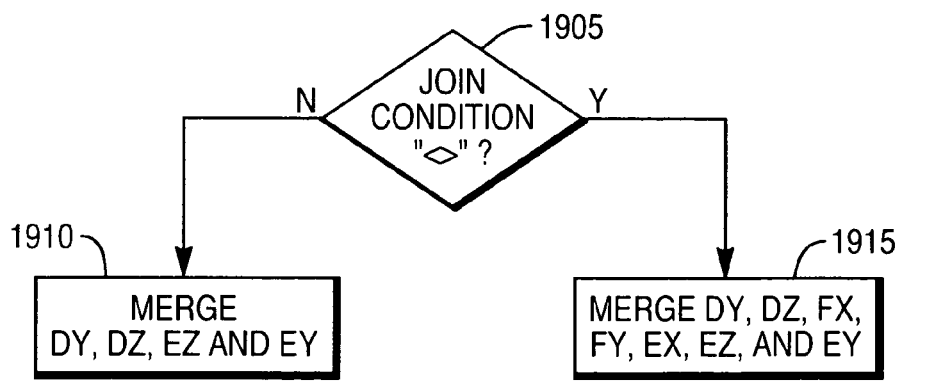
FIG. 19 is a flow chart of a system for merging.

FIG. 19 shows a system for merging the Cartesian products and query results. The system determines if the join condition is a not equal condition (block 1905). If the join condition is not a not equal condition, the system merges the worktables DY, DZ, EZ, and EY (block 1910), otherwise the system merges the worktables DY, DZ, FX, FY, EX, EZ, and EY (block 1915).

In one example system, where the Cartesian product DFXYZ was generated in place of DY, DZ, FX, and FY (block 1655 in FIGS. 16, 17), the example system merges the worktables DFXYZ, EX, EZ, and EY.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a database query to join a column A and a column B on an inequality condition, the method including:
    determining a minimum and a maximum value for A, using a value-count index for A, the value-count index for A including which values appear in A and how many times the values appear in A;
    determining a minimum and a maximum value for B, using a value-count index for B, the value-count index for B including which values appear in B and how many times the values appear in B;
    defining three or more sets of values in A, relative to the minimum and maximum values for B;
    defining three or more sets of values in B, relative to the minimum and maximum values for A;
    generating one or more Cartesian products, where each Cartesian product is between a set of values in A and a set of values in B;
    performing the database query on a set of values in A and a set of values in B to generate a partial query result;
    merging one or more Cartesian products and the partial query result; and
    storing the merged one or more Cartesian products and the partial query result.

2. The method of claim 1, where determining a minimum and a maximum value for A, using the value-count index for A includes:
    scanning the value-count index for A to determine the minimum value for A and the maximum value for A.

3. The method of claim 1, where determining a minimum and a maximum value for B, using the value-count index for B includes:
    scanning the value-count index for B to determine the minimum value for B and the maximum value for B.

4. The method of claim 1, where column A is in a table T1 including zero or more rows and one or more columns, and where defining three sets of values in A, relative to the minimum and maximum values for B includes:
    for each row in T1:
        if A is less than the minimum value for B, projecting one or more columns from the row into a partition D;
        if A is less than or equal to the maximum value for B and T1.A is greater than or equal to the minimum value for B, projecting one or more columns from the row into a partition E; and
        if A is greater than the maximum value for B, projecting one or more columns from the row into a partition F.

5. The method of claim 4, where column B is in a table T2 including zero or more rows and one or more columns, and where defining three sets of values in B, relative to the minimum and maximum values for A includes:
    for each row in T2:
        if B is less than the minimum value for A, projecting one or more columns from the row into a partition X;
        if B is less than or equal to the maximum value for A and T1.B is greater than or equal to the minimum value for A, projecting one or more columns from the row into a partition Y; and
        if B is greater than the maximum value for A, projecting one or more columns from the row into a partition Z.

6. The method of claim 5, where the inequality condition is a "less than" or a "less than" or "equal" condition, and where generating one or more Cartesian products includes:
    generating a Cartesian product of partition D and partition Y;
    generating a Cartesian product of partition D and partition Z; and
    generating a Cartesian product of partition E and partition Z.

7. The method of claim 5, where the inequality condition is a "less than" or a "less than or equal" condition, and where performing the database query on a set of values in A and a set of values in B to generate a partial query result includes:

performing the database query on partition E and partition Y.

8. The method of claim 7, where merging one or more Cartesian products and the partial query result includes:
merging:
the partial query result of the database query on partition E and partition Y;
a Cartesians product of partition D and partition Y;
a Cartesian product of partition D and partition Z; and
a Cartesian product of partition E and partition Z.

9. The method of claim 5, where the inequality condition is a "not equal" condition, and where generating one or more Cartesian products includes:
generating a Cartesian product of partition D and partition Y;
generating a Cartesian product of partition D and partition Z;
generating a Cartesian product of partition E and partition X;
generating a Cartesian product of partition E and partition Z;
generating a Cartesian product of partition F and partition X; and
generating a Cartesian product of partition F and partition Y.

10. The method of claim 9, where:
performing the database query on a set of values in A and a set of values in B to generate a partial query result includes:
performing the database query on partition E and partition Y;
and where merging one or more Cartesian products and the partial query result includes:
merging:
the partial query result of the database query on partition E and partition Y;
the Cartesian product of partition D and partition Y;
the Cartesian product of partition D and partition Z;
the Cartesian product of partition E and partition X;
the Cartesian product of partition E and partition Z;
the Cartesian product of partition F and partition X; and
the Cartesian product of partition F and partition Y.

11. The method of claim 5, where the inequality condition is a "not equal" condition, and where generating one or more Cartesian products includes:
merging partition D and partition F to form a partition DF;
merging partition X, partition Y, and partition Z to for a partition XYZ;
generating a Cartesian product of partition DF and partition XYZ.

12. The method of claim 11, where:
performing the database query on a set of values in A and a set of values in B to generate a partial query result includes:
performing the database query on partition E and partition Y;
and where merging one or more Cartesian products and the partial query result includes:
merging:
the partial query result of the database query on partition E and partition Y;
the Cartesian product of partition DF and partition XYZ;
the Cartesian product of partition E and partition X; and
the Cartesian product of partition E and partition Z.

13. The method of claim 5, where the inequality condition is a "not equal" condition, and where performing the database query on a set of values in A and a set of values in B to generate a partial query result includes:
performing the database query on partition E and partition Y.

14. The method of claim 1, where the inequality condition is a "less than or equal" condition or a "greater than or equal" condition, where column A is in a table T1 including zero or more rows and one or more columns, and where defining three sets of values in A, relative to the minimum and maximum values for B includes:
for each row in T1:
if T1.A is less than or equal to the minimum value for B, projecting one or more columns from the row into a partition D;
if T1.A is less than or equal to the maximum value for B and T1.A is greater than the minimum value for B, projecting one or more columns from the row into a partition E; and
if T1.A is greater than or the maximum value for B, projecting one or more columns from the row into a partition F.

15. The method of claim 14, where column B is in a table T2 including zero or more rows and one or more columns, and where defining three sets of values in B, relative to the minimum and maximum values for A includes:
for each row in T2:
if T2.B is less than the minimum value for A, projecting one or more columns from the row into a partition X;
if T2.B is less than the maximum value for A and T2.B is greater than or equal to the minimum value for A, projecting one or more columns from the row into a partition Y; and
if T2.B is greater than or equal to the maximum value for A, projecting one or more columns from the row into a partition Z.

16. The method of claim 1, where the inequality condition is a "greater than" condition, the method including:
converting the query to a query including a "less than" inequality condition.

17. The method of claim 1, where the inequality condition is a "greater than or equal to" condition, the method including:
converting the query to a query including a "less than or equal to" inequality condition.

18. A computer program, stored on a tangible storage medium, for use in performing a database query to join a column A and a column B on an inequality condition, the computer program including executable instructions that cause a computer to:
determine a minimum and a maximum value for A, using a value-count index for A, the value-count index for A including which values appear in A and how many times the values appear in A;
determine a minimum and a maximum value for B, using a value-count index for B, the value-count index for B including which values appear in B and how many times the values appear in B;
define three or more sets of values in A, relative to the minimum and maximum values for B;
define three or more sets of values in B, relative to the minimum and maximum values for A;
generate one or more Cartesian products, where each Cartesian product is between a set of values in A and a set of values in B;

perform the database query on a set of values in A and a set of values in B to generate a partial query result;
merge one or more Cartesian products and the result; and
storing the merged one or more Cartesian products and the result.

19. The computer program of claim 18, where the executable instructions that cause the computer to determine a minimum and a maximum value for A, using the value-count index for A further cause the computer to:
scan the value-count index for A to determine the minimum value for A and the maximum value for A.

20. The computer program of claim 18, where the executable instructions that cause the computer to determine a minimum and a maximum value for B, using the value-count index for B further cause the computer to:
scan the value-count index for B to determine the minimum value for B and the maximum value for B.

21. The computer program of claim 18, where column A is in a table T1 including zero or more rows and one or more columns, and where the executable instructions that cause the computer to define three sets of values in A, relative to the minimum and maximum values for B further cause the computer to:
for each row in T1:
  if A is less than the minimum value for B, project one or more columns from the row into a partition D;
  if A is less than or equal to the maximum value for B and T1.A is greater than or equal to the minimum value for B, project one or more columns from the row into a partition E; and
  if A is greater than the maximum value for B, project one or more columns from the row into a partition F.

22. The computer program of claim 21, where column B is in a table T2 including zero or more rows and one or more columns, and where the executable instructions that cause the computer to define three sets of values in B, relative to the minimum and maximum values for A further cause the computer to:
for each row in T2:
  if B is less than the minimum value for A, project one or more columns from the row into a partition X;
  if B is less than or equal to the maximum value for A and T1.B is greater than or equal to the minimum value for A, project one or more columns from the row into a partition Y; and
  if B is greater than the maximum value for A, project one or more columns from the row into a partition Z.

23. The computer program of claim 22, where the inequality condition is a "less than" or a "less than or equal" condition, and where the executable instructions that cause the computer to generate one or more Cartesian products further cause the computer to:
generate a Cartesian product of partition D and partition Y;
generate a Cartesian product of partition D and partition Z; and
generate a Cartesian product of partition E and partition Z.

24. The computer program of claim 22, where the inequality condition is a "less than" or a "less than or equal" condition, and where the executable instructions that cause the computer to perform the database query on a set of values in A and a set of values in B to generate a partial query result further cause the computer to:
perform the database query on partition E and partition Y.

25. The computer program of claim 24, where the executable instructions that cause the computer to merge one or more Cartesian products and the partial query result further cause the computer to:
merge:
  the partial query result of the database query on partition E and partition Y;
  a Cartesians product of partition D and partition Y;
  a Cartesian product of partition D and partition Z; and
  a Cartesian product of partition E and partition Z.

26. The computer program of claim 24, where the inequality condition is a "not equal" condition, and where the executable instructions that cause the computer to generate one or more Cartesian products further cause the computer to:
generate a Cartesian product of partition D and partition Y;
generate a Cartesian product of partition D and partition Z;
generate a Cartesian product of partition E and partition X;
generate a Cartesian product of partition E and partition Z;
generate a Cartesian product of partition F and partition X; and
generate a Cartesian product of partition F and partition Y.

27. The computer program of claim 26, where the executable instructions that cause the computer to:
perform the database query on a set of values in A and a set of values in B to generate a partial query result further cause the computer to:
  perform the database query on partition E and partition Y;
and where the executable instructions that cause the computer to merge one or more Cartesian products and the partial query result further cause the computer to:
merge:
  the partial query result of the database query on partition E and partition Y;
  the Cartesian product of partition D and partition Y;
  the Cartesian product of partition D and partition Z;
  the Cartesian product of partition E and partition X;
  the Cartesian product of partition E and partition Z;
  the Cartesian product of partition F and partition X; and
  the Cartesian product of partition F and partition Y.

28. The computer program of claim 22, where the inequality condition is a "not equal" condition, and where the executable instructions that cause the computer to generate one or more Cartesian products further cause the computer to:
merge partition D and partition F to form a partition DF;
merge partition X, partition Y, and partition Z to for a partition XYZ; and
generate a Cartesian product of partition DF and partition XYZ.

29. The computer program of claim 28, where the executable instructions that cause the computer to:
perform the database query on a set of values in A and a set of values in B to generate a partial query result further cause the computer to:
  perform the database query on partition E and partition Y;
and where the executable instructions that cause the computer to merge one or more Cartesian products and the partial query result further cause the computer to:
merge:
  the partial query result of the database query on partition E and partition Y;
  the Cartesian product of partition DF and partition XYZ;
  the Cartesian product of partition E and partition X; and
  the Cartesian product of partition E and partition Z.

30. The computer program of claim 22, where the inequality condition is a "not equal" condition, and where the executable instructions that cause the computer to perform the database query on a set of values in A and a set of values in B to generate a partial query result further cause the computer to:
  perform the database query on partition E and partition Y.

31. The computer program of claim 18, where the inequality condition is a "less than or equal" condition or a "greater than or equal" condition, where column A is in a table T1 including zero or more rows and one or more columns, and where the executable instructions that cause the computer to define three sets of values in A, relative to the minimum and maximum values for B further cause the computer to:
  for each row in T1:
    if T1.A is less than or equal to the minimum value for B, project one or more columns from the row into a partition D;
    if T1.A is less than or equal to the maximum value for B and T1.A is greater than the minimum value for B, project one or more columns from the row into a partition E; and
    if T1.A is greater than or the maximum value for B, project one or more columns from the row into a partition F.

32. The computer program of claim 31, where column B is in a table T2 including zero or more rows and one or more columns, and where the executable instructions that cause the computer to define three sets of values in B, relative to the minimum and maximum values for A further cause the computer to:
  for each row in T2:
    if T2.B is less than the minimum value for A, project one or more columns from the row into a partition X;
    if T2.B is less than the maximum value for A and T2.B is greater than or equal to the minimum value for A, project one or more columns from the row into a partition Y; and
    if T2.B is greater than or equal to the maximum value for A, project one or more columns from the row into a partition Z.

33. The computer program of claim 18, where the inequality condition is a "greater than" condition, the executable instructions that cause the computer further causing the computer to:
  convert the query to a query including a "less than" inequality condition.

34. The computer program of claim 18, where the inequality condition is a "greater than or equal to" condition, the executable instructions that cause the computer further causing the computer to:
  convert the query to a query including a "less than or equal to" inequality condition.

35. A database system including:
  a massively parallel processing system including:
    one or more nodes;
    a plurality of CPUs, each of the one or more nodes providing access to one or more CPUs;
    a plurality of data storage facilities each of the one or more CPUs providing access to one or more data storage facilities;
    a process for execution on the massively parallel processing system for performing a database query to join a column A and a column B on an inequality condition, a database including value-count indexes for columns A and B, the value-count index for A including which values appear in A and how many times the values appear in A, the value-count index for B including which values appear in B and how many times the values appear in B, the process including:
      determining a minimum and a maximum value for A, using the value-count index for A;
      determining a minimum and a maximum value for B, using the value-count index for B;
      defining three or more sets of values in A, relative to the minimum and maximum values for B;
      defining three or more sets of values in B, relative to the minimum and maximum values for A;
      generating one or more Cartesian products, where each Cartesian product is between a set of values in A and a set of values in B;
      performing the database query on a set of values in A and a set of values in B to generate a partial query result;
      merging one or more Cartesian products and the partial query result; and
      storing the merged one or more Cartesian products and the partial query result.

36. The database system of claim 35, where determining a minimum and a maximum value for A, using the value-count index for A includes:
  scanning the value-count index for A to determine the minimum value for A and the maximum value for A.

37. The database system of claim 35, where determining a minimum and a maximum value for B, using the value-count index for B includes:
  scanning the value-count index for B to determine the minimum value for B and the maximum value for B.

38. The database system of claim 35, where column A is in a table T1 including zero or more rows and one or more columns, and where defining three sets of values in A, relative to the minimum and maximum values for B includes:
  for each row in T1:
    if A is less than the minimum value for B, projecting one or more columns from the row into a partition D;
    if A is less than or equal to the maximum value for B and T1.A is greater than or equal to the minimum value for B, projecting one or more columns from the row into a partition E; and
    if A is greater than the maximum value for B, projecting one or more columns from the row into a partition F.

39. The database system of claim 38, where column B is in a table T2 including zero or more rows and one or more columns, and where defining three sets of values in B, relative to the minimum and maximum values for A includes:
  for each row in T2:
    if B is less than the minimum value for A, projecting one or more columns from the row into a partition X;
    if B is less than or equal to the maximum value for A and T1.B is greater than or equal to the minimum value for A, projecting one or more columns from the row into a partition Y; and
    if B is greater than the maximum value for A, projecting one or more columns from the row into a partition Z.

40. The database system of claim 39, where the inequality condition is a "less than" or a "less than or equal" condition, and where generating one or more Cartesian products includes:
  generating a Cartesian product of partition D and partition Y;
  generating a Cartesian product of partition D and partition Z; and
  generating a Cartesian product of partition E and partition Z.

41. The database system of claim 39, where the inequality condition is a "less than" or a "less than or equal" condition, and where performing the database query on a set of values in A and a set of values in B to generate a partial query result includes:
    performing the database query on partition E and partition Y.

42. The database system of claim 41, where merging one or more Cartesian products and the partial query result includes:
    merging:
        the partial query result of the database query on partition E and partition Y;
        a Cartesians product of partition D and partition Y;
        a Cartesian product of partition D and partition Z; and
        a Cartesian product of partition E and partition Z.

43. The database system of claim 39, where the inequality condition is a "not equal" condition, and where generating one or more Cartesian products includes:
    generating a Cartesian product of partition D and partition Y;
    generating a Cartesian product of partition D and partition Z;
    generating a Cartesian product of partition E and partition X;
    generating a Cartesian product of partition E and partition Z;
    generating a Cartesian product of partition F and partition X; and
    generating a Cartesian product of partition F and partition Y.

44. The database system of claim 43, where:
performing the database query on a set of values in A and a set of values in B to generate a partial query result includes:
    performing the database query on partition E and partition Y;
and where merging one or more Cartesian products and the partial query result includes:
    merging:
        the partial query result of the database query on partition E and partition Y;
        the Cartesian product of partition D and partition Y;
        the Cartesian product of partition D and partition Z;
        the Cartesian product of partition E and partition X;
        the Cartesian product of partition E and partition Z;
        the Cartesian product of partition F and partition X; and
        the Cartesian product of partition F and partition Y.

45. The database system of claim 39, where the inequality condition is a "not equal" condition, and where generating one or more Cartesian products includes:
    merging partition D and partition F to form a partition DF;
    merging partition X, partition Y, and partition Z to for a partition XYZ; and
    generating a Cartesian product of partition DF and partition XYZ.

46. The database system of claim 45, where:
performing the database query on a set of values in A and a set of values in B to generate a partial query result includes:
    performing the database query on partition E and partition Y;
and where merging one or more Cartesian products and the partial query result includes:
    merging:
        the partial query result of the database query on partition E and partition Y;
        the Cartesian product of partition DF and partition XYZ;
        the Cartesian product of partition E and partition X; and
        the Cartesian product of partition E and partition Z.

47. The database system of claim 39, where the inequality condition is a "not equal" condition, and where performing the database query on a set of values in A and a set of values in B to generate a partial query result includes:
    performing the database query on partition E and partition Y.

48. The database system of claim 35, where the inequality condition is a "less than or equal" condition or a "greater than or equal" condition, where column A is in a table T1 including zero or more rows and one or more columns, and where defining three sets of values in A, relative to the minimum and maximum values for B includes:
    for each row in T1:
        if T1.A is less than or equal to the minimum value for B, projecting one or more columns from the row into a partition D;
        if T1.A is less than or equal to the maximum value for B and T1.A is greater than the minimum value for B, projecting one or more columns from the row into a partition E; and
        if T1.A is greater than or the maximum value for B, projecting one or more columns from the row into a partition F.

49. The database system of claim 48, where column B is in a table T2 including zero or more rows and one or more columns, and where defining three sets of values in B, relative to the minimum and maximum values for A includes:
    for each row in T2:
        if T2.B is less than the minimum value for A, projecting one or more columns from the row into a partition X;
        if T2.B is less than the maximum value for A and T2.B is greater than or equal to the minimum value for A, projecting one or more columns from the row into a partition Y; and
        if T2.B is greater than or equal to the maximum value for A, projecting one or more columns from the row into a partition Z.

50. The database system of claim 35, where the inequality condition is a "greater than" condition, the process including:
    converting the query to a query including a "less than" inequality condition.

51. The database system of claim 35, where the inequality condition is a "greater than or equal to" condition, the process including:
    converting the query to a query including a "less than or equal to" inequality condition.

* * * * *